(12) United States Patent
Giardini et al.

(10) Patent No.: US 9,688,907 B2
(45) Date of Patent: Jun. 27, 2017

(54) METHOD OF TREATING SUBTERRANEAN FORMATIONS

(71) Applicant: LAMBERTI SPA, Albizzate (VA) (IT)

(72) Inventors: Lorenzo Giardini, Genoa (IT); Luigi Merli, Saronno (IT); Valentina Langella, Milan (IT); Mauro Riccaboni, Legnano (IT); Barbara Biasotti, Casarza Ligure (IT); Giovanni Floridi, Novara (IT); Giuseppe Li Bassi, Gavirate (IT); Pierangelo Pirovano, Comerio (IT)

(73) Assignee: LAMBERTI SPA, Albizzate (VA) (IT)

( * ) Notice: Subject to any disclaimer, the term of this patent is extended or adjusted under 35 U.S.C. 154(b) by 214 days.

(21) Appl. No.: 14/407,384

(22) PCT Filed: Jun. 5, 2013

(86) PCT No.: PCT/EP2013/061534
§ 371 (c)(1),
(2) Date: Dec. 11, 2014

(87) PCT Pub. No.: WO2013/186093
PCT Pub. Date: Dec. 19, 2013

(65) Prior Publication Data
US 2015/0126416 A1 May 7, 2015

(30) Foreign Application Priority Data
Jun. 11, 2012 (IT) .............................. VA2012A0016

(51) Int. Cl.
*C09K 8/68* (2006.01)
*E21B 43/26* (2006.01)
*C09K 8/90* (2006.01)

(52) U.S. Cl.
CPC ................ *C09K 8/685* (2013.01); *C09K 8/68* (2013.01); *C09K 8/90* (2013.01); *E21B 43/26* (2013.01)

(58) Field of Classification Search
None
See application file for complete search history.

(56) References Cited

U.S. PATENT DOCUMENTS

| | | | |
|---|---|---|---|
| 3,297,538 A | 1/1967 | Grumm et al. | |
| 3,483,121 A * | 12/1969 | Jordan ..................... | C09K 8/62 137/13 |
| 3,808,195 A | 4/1974 | Shelso et al. | |
| 4,094,795 A * | 6/1978 | DeMartino .............. | C09K 8/62 507/201 |
| 4,169,798 A * | 10/1979 | DeMartino .............. | C09K 8/62 507/201 |
| 4,244,826 A * | 1/1981 | Swanson ................ | C09K 8/035 166/307 |
| 4,371,443 A * | 2/1983 | Keeney .................... | C09K 8/72 166/300 |
| 4,486,340 A * | 12/1984 | Glass, Jr. ................ | C08L 1/284 166/275 |
| 4,540,510 A * | 9/1985 | Karl ....................... | A61K 8/731 507/211 |
| 4,604,217 A * | 8/1986 | Lukach .................. | C09K 8/508 507/215 |
| 5,165,479 A | 11/1992 | Harris et al. | |
| 6,257,336 B1 * | 7/2001 | Audibert ................ | C04B 24/38 106/730 |
| 2006/0107998 A1 | 5/2006 | Kholy et al. | |

* cited by examiner

Primary Examiner — John J Figueroa
(74) Attorney, Agent, or Firm — Mossman, Kumar & Tyler PC

(57) ABSTRACT

The present disclosure relates to a method of treating a portion of a subterranean formation comprising the use of an aqueous fracturing fluid containing a fast dissolving and easily dispersible unpurified polygalactomannan ether.

21 Claims, No Drawings

METHOD OF TREATING SUBTERRANEAN FORMATIONS

TECHNICAL FIELD

The present disclosure relates to a method of treating a portion of a subterranean formation through the use of an aqueous fracturing fluid comprising dissolved therein from 0.3 to 3.0% by weight of a viscosifying agent, wherein said viscosifying agent is a fast dissolving and easy dispersible unpurified polygalactomannan ether.

BACKGROUND OF THE ART

Hydraulic fracturing is widely used for stimulating petroleum and gas production and recovery from subterranean formations.

It involves the injection of a suitable fluid down a wellbore to reach a formation; the fluid shall be injected under sufficient pressure to extensively crack the formation and to provide passageways for the oil and gas that are contained in the pores spaces of the formation and help them flowing to the wellbore. Suitable particulate materials (proppants) are often injected into the formation to prevent the closure of the fractures.

Usually, fracturing fluids are gelled with water soluble polymers, especially with natural polymers or chemically modified natural polymers, such as etherified natural polymers, to most effectively widen the fractures and inhibit fluid loss, Water soluble polymers are mainly available in powder form and must be dissolved in the aqueous fluid to perform their viscosifying function.

Dissolution of natural polymer particles in aqueous fluids is typically accompanied by the formation of lumps; upon contact with water, a thin, sticky layer of gel forms on the surface of the particles preventing water from hydrating the inner part of the particles and favoring the formation of lumps.

As a consequence, the whole hydration step of the polymer is undesirably prolonged, especially if the polymer shall be dissolved in large amounts of saline aqueous fluids, which often happens in the preparation of aqueous fracturing fluids.

Among the natural polymers that are used to thicken fracturing fluids, polygalactomannan gums and chemically modified polygalactomannan are widely used, because they form strong gels in combination with crosslinkers that are usually based on titanium, zirconium and boron salts.

Polygalactomannans (also called galactomannans) are polysaccharides obtained from the endosperms of leguminosae seeds consisting of a mannose backbone with galactose side groups (more specifically, a (1-4)-linked beta-D-mannopyranose backbone with branchpoints from their 6-positions linked to alpha-D-galactose, i.e. 1-6-linked alpha-D-galactopyranose).

To provide a gelled fracturing fluid, polygalactomannan gums and chemically modified polygalactomannans shall be previously dissolved in the aqueous component of the fluid and then crosslinked with a crosslinking composition. Unfortunately, also the dissolution of polygalactomannan gums and chemically modified polygalactomannans, such as etherified polygalactomannans, suffer from the disadvantages described above, i.e. the formation of lumps.

Many solutions have been put into practice to avoid lumping in the preparation of fracturing fluids, including apparatus that are specifically designed to hydrate the polymers and to continuously produce viscous treatment gel close to the oil well site, as it is known from US 2006/107998.

Another way to rapidly hydrate the viscosifying polymers is to prepare a concentrated slurry of the polymer in a non-aqueous carrier fluid, usually a hydrocarbon fluid, glycols or glycol derivatives, which facilitates the polymer dispersion and slurry mixing, but may represent a concern for the environment and an additional cost.

It is also well known in the art (by way of example from U.S. Pat. No. 5,165,479) to treat natural gums with small amounts of crosslinking agents, such as glyoxal, borates and the like, to inhibit hydration and minimize the formation of lumps upon contact with water.

U.S. Pat. No. 3,808,195, by way of example, describes a process for rendering polygalactomannans and their water-soluble derivatives dispersible comprising treating the gums and gum derivatives with boron salts.

U.S. Pat. No. 3,297,583 describes a method for the rapid and lump-free dissolution of many macromolecular substances that involves the use of from 0.005% to 5% by weight of aldehydes as crosslinking agents to improve dispersibility.

Although treatment with crosslinking agents is well known to improve dispersibility of polygalactomannans, the net result of the treatment with crosslinking agents disclosed by the prior art are polymers that are dispersible but have a dissolution time which may still be unsuitable for fracturing operations.

Therefore, it would be highly desirable to provide a polygalactomannan which is readily soluble and can be used as viscosifying agent for aqueous based fracturing fluids because of its fast dissolving characteristics and dispersibility.

The polygalactomannan ethers commonly used in the field are purified products, i.e. the reaction by-products have been removed by washing the reaction mass, so that they usually contain more than 95% by weight of active matter.

It has now been found that unpurified polygalactomannan ethers are more easily dispersible and fast dissolving in fracturing fluid when compared to the corresponding purified products. Unexpectedly, their impurities beneficially affect their dissolution rate and their dispersibility without impairing the characteristics required as viscosifying agent.

With the expression "unpurified polygalactomannan ethers" we mean polygalactomannan ethers which have not been washed after the etherification and contain from 4 to 25% by dry weight of the etherification reaction by-products. The amount of the etherification reaction by-product (impurities) is measured as the ash content, for carboxyalkyl or cationic ethers of polygalactomannans, and as the sum of the ash content and the glycol and polyglycol content for hydroxyalkyl or mixed ethers of polygalactomannans. In the present text, with the expression "molar substitution" (MS), we mean the average number of hydroxyalkyl substituents on each anhydroglycosidic unit of the polygalactomannan, which can be measured, for example, by $^1$H-NMR.

With the expression "degree of substitution" (DS), we mean the average number of substituted hydroxyl groups on each anhydroglycosidic unit of the polygalactomannan, which can be measured, for example, by $^1$H-NMR.

DESCRIPTION OF THE INVENTION

In one aspect, the disclosure relates to a method of treating a portion of a subterranean formation comprising:

a) providing an aqueous fracturing fluid comprising dissolved therein from 0.3 to 3.0% by weight of a viscosifying agent, wherein said viscosifying agent is an unpurified polygalactomannan ether containing from 4 to 25% by dry weight of impurities prepared according to the following process of etherification:
   I) reacting a polygalactomannan with an etherifying agent in the presence of an alkaline catalyst;
   II) drying and recovering the unpurified polygalactomannan ether; with the proviso that the process of etherification of the polygalactomannan does not comprise any purification or washing step;
b) optionally adding a crosslinking composition;
c) placing the fracturing fluid into a portion of a subterranean formation.

DETAILED DESCRIPTION OF THE INVENTION

The amount of impurities in the unpurified polygalactomannan ether is calculated as the sum of the ash content and the glycols and polyglycols content.

The ash content is determined at 900° C. according to the ASTM D586-97(r02) standard method. The glycol and polyglycol content, mainly consisting of di- and tri-glycol, is determined by gas-chromatography with internal standardization after extraction for 40 min at 40° C. with acetone.

For the realization of the method of the present invention the unpurified polygalactomannan ether preferably contains from 5 to 20% by dry weight of impurities.

Polygalactomannan ethers that can be used in the method of the invention are hydroxyalkyl ethers of polygalactomannans, e.g. hydroxypropyl ethers and hydroxyethyl ethers, carboxyalkyl ethers of polygalactomannans, e.g. carboxymethyl ethers and carboxyethyl ethers, mixed carboxyalkyl and hydroxyalkyl ethers of polygalactomannans, and cationic ethers of polygalactomannans.

The etherification step I) of the invention is well known in the art.

Polygalactomannans suitable for the process of the invention may be extracted, for example, from Trigonella foenumgraecum (fenugreek gum), *Cyamopsis tetragonoloba* (guar gum), *Cesalpinia spinosa* (tara gum), *Ceratonia siliqua* (locust bean gum or carob gum), *Cassia tora* and *Cassia obtusifolia* (cassia gum). These polygalactomannans differ from one another in the mannose-to-galactose ratio. In order of increasing ratio, fenugreek gum has a mannose:galactose ratio about 1:1, guar gum about 2:1, tara gum about 3:1, locust bean gum or carob gum about 4:1 and *cassia* gum about 5:1.

Step I) of the process of the present invention is applicable to polygalactomannan in the form of flour or in the form of "splits". The term "split" indicates the endosperm which is obtained by removal of the hull and the germ from the leguminosae seed.

Before the etherification, the polygalactomannan splits or flour are usually swelled or suspended in water or in a water/water soluble solvent mixture. Suitable solvents are methanol, ethanol and secondary lower alkanols, such as isopropanol, sec-butanol, sec-amyl alcohol, or tertiary lower alkanols.

The alkaline catalysts of step I) are in general alkali metal or alkaline earth metal hydroxides, such as sodium, potassium or calcium hydroxide.

Suitable etherifying agents for the preparation of hydroxyalkyl ethers of polygalactomannans are alkylene oxides, e.g., ethylene oxide, propylene oxide, butylene oxide to obtain hydroxyethyl polygalactomannans, hydroxypropyl polygalactomannans or hydroxybutyl polygalactomannans.

Halo-carboxylic acids such as monochloroacetic acid or its salts can be used for the preparation of carboxyalkyl ethers.

Cationic ethers can be prepared using tertiary amino or quaternary ammonium alkylating reagents such as 2-dialkylaminoethyl chloride, 3-chloro-2-hydroxypropyltrimethyl ammonium chloride and 2,3-epoxy-propyltrimethyl ammonium chloride.

Mixed ethers can be prepared adding mixture of the mentioned etherifying agents.

The reaction can be conducted at room temperature or at elevated temperatures for a time sufficient to complete the reaction, usually in from about 0.5 to about 24 hours.

Thereafter, the pH of the resulting alkaline material can be reduced to a neutral or slightly acid value. Any acid may be selected to neutralize the reaction mixture; examples of suitable acids are carbon dioxide, phosphoric acid, sulfuric acid and acetic acid. The amount of acid used is the amount which is necessary to reach the desired pH range.

The commercially available polygalactomannan ethers commonly used in the field are purified after these steps by washing with water, an organic solvent, such as isopropanol or acetone, or a mixture of water and organic solvents.

On the contrary, the polygalactomannan ethers of the present invention are not washed/purified and still contain by-products generated during their chemical preparation (that is during etherification).

At the end of the process, the unpurified polygalactomannan ethers are dried and recovered using means known in the art. Optionally the polygalactomannan ethers can be milled before being dried.

The unpurified galactomannan ethers obtained from this process still contain from 4 to 25% by dry weight of impurities as defined above.

More specific details about the preparation of the polygalactomannan ethers can be found, for example, in "Industrial Gums: Polysaccharides and their Derivatives", 3$^{rd}$ Ed., Whistler, Roy L., and BeMiller, James N., Academic Press (1993).

The hydroxyalkyl ethers of polygalactomannans may have molar substitution comprised between 0.1 and 2, preferably between 0.2 and 0.9, more preferably between 0.3 and 0.6.

The carboxyalkyl ethers may have degree of substitution from 0.1 to 0.5, preferably from 0.1 to 0.3.

The mixed ethers may have a MS and DS comprised in the same range of the mono-ethers.

The cationic polygalactomannans may have degree of substitution from 0.1 to 0.5.

In a preferred embodiment, the unpurified polygalactomannan ether has been treated during the preparation process with a small amount of crosslinking agent and thus contains from 0.01 to 0.05% by weight, preferably from 0.02 to 0.04% by weight, of crosslinking agent. Preferred crosslinking agent are glyoxal and boron containing compounds.

A 1% by weight aqueous solution of the unpurified polygalactomannan ether to be used in the method preferably exhibits a RVT Brookfield® viscosity not lower than 500 mPa·s at 20° C. and 20 rpm.

The unpurified polygalactomannan ethers of the disclosure preferably passes for 95% of their weight through a 200 mesh standard sieve.

For the realization of the present invention guar is the preferred polygalactomannan and hydroxypropyl guar, carboxymethyl guar and carboxymethyl hydroxypropyl guar are the preferred polygalactomannan ethers.

The unpurified polygalactomannan ethers of the invention are fast hydrating and easily dispersible and can be advantageously used as viscosifying agents in aqueous based fracturing fluids.

Any type of aqueous hydraulic fracturing fluid can be used in the method of the invention. The fluid can be, for example, a gelled fluid, including linear or crosslinked gels, or a foamed gel, wherein foam bubbles help to transport and to place proppants into fractures.

In the method for treating a subterranean formation according to the disclosure, it is possible to add a crosslinking agent during the preparation of the fluid. This allows to substantially increase the viscosity of the polymer solution by forming a crosslinked polymer network in the aqueous based fluid. The crosslinking agents utilizable in the optional step b) are those commonly used in the field.

While a variety of crosslinking agents can be utilized to crosslink the thickened aqueous fluid, preferred crosslinking agents include, but are not limited to, boron containing compounds and transition metal ion crosslinking agents.

Examples of boron crosslinking agents include: borate ion releasing compounds, such as boric acid, boric oxide, pyroboric acid, metaboric acid, borax, sodium tetraborate, pentaborate; ulexite, colemanite, and other slow dissolving crosslinking borate minerals.

Transition metal ion crosslinking agents are, for example, zirconium and titanium releasing compounds, such as titanium dioxide, zirconium oxychloride, zirconium lactate, zirconium glycolate, zirconium lactate triethanolamine, zirconium acetylacetonate, titanium citrate, titanium maleate, titanium tartrate, and other titanium and zirconium chelates.

If desired, mixtures of the crosslinking agents may be used in the crosslinking composition.

The aqueous component of the fracturing fluid may be selected from fresh water, salt water, seawater, natural or synthetic brine, mixtures of water and water soluble organic compounds, any other aqueous liquid that does not interact with the other components of the well treatment fluid to adversely affect its performance, and mixtures thereof.

Preferably the crosslinking compositions also comprise a delaying agent. These delaying agents delay the rate of crosslinking reaction for a sufficient time to allow the aqueous thickened fluid to be easily pumped into the subterranean zone The aqueous fracturing fluid, beside the viscosifying agent, the crosslinking composition and the aqueous component, normally contains additives that are well known by those skilled in the art, such as proppants, gel breakers, buffers, clay stabilizers, oxygen scavengers, etc.

Useful gel breakers include, but are not limited to, ammonium persulfate, sodium persulfate, sodium bromate and sodium chlorite, enzymes. Preferably, the gel breaker is a delayed gel breaker, such as encapsulated ammonium persulfate. A delayed gel breaker slowly releases the oxidizer from the polymer coating to enable a strong initial gel to carry and to deposit the proppants in the formation.

The fluid also optionally includes one or more proppants suspended in the fluid. Useful proppants include, but are not limited to, gravel, sand, resin coated sand, ceramic beads, bauxite, glass, glass beads and mixtures thereof. The aqueous fracturing fluid also optionally includes one or more buffers. Useful buffers include, but are not limited to, potassium carbonate, sodium carbonate, potassium bicarbonate, sodium bicarbonate, sodium sesquicarbonate, potassium sesquicarbonate, potassium hydroxide, sodium hydroxide, and mixtures thereof. The buffer may be added to the fluid prior to adding the crosslinking composition. The aqueous fracturing fluid of the disclosure may optionally include one or more conventional additives that do not adversely affect the performance of the well treatment fluid. Such additives include, but are not limited to, clay stabilizers, gel stabilizers, surfactants, bactericides and the like.

Generally the thickened aqueous fracturing fluids of the invention have a Fann viscosity of above about 50 mPa·s at 100 sec$^{-1}$, and, more preferably, above about 100 mPa·s at 100 sec$^{-1}$.

In the method of the disclosure, the aqueous fracturing fluid is finally pumped or injected into the subterranean formation (e.g., from the surface through the wellbore). Preferably, the fluid is pumped or injected at a pressure sufficient to fracture the formation (e.g., generate a plurality of fractures) and thus to enable the particulate solid (proppants) suspended in the well treatment fluid to be carried into the fractures and to be there deposited.

The following examples are included to demonstrate preferred embodiments of the invention.

EXAMPLES

Examples 1-5

Preparation of Purified and Unpurified Hydroxypropyl Guar 800 g of guar flour or guar splits (see Table 1) were loaded in a 5 litres stirred reactor at room temperature. The reaction atmosphere was made inert by means of vacuum/nitrogen washings, and, under vigorous stirring, different amounts of NaOH (see Table 1) and, for Examples 1-4, 2.5 g of borax in 440 g of water/isopropanol were added. The mixture was maintained under stirring for 15 minutes at 20° C. The reactor was evacuated and refilled three times with nitrogen then different amounts of propylene oxide (PO, see Table 1) were added. The reaction mixtures were maintained for 45 minutes at 70-75° C. under stirring. Afterwards the reaction mass was cooled down to 40° C., the solvent was distilled off and the pH of the mass was brought down to a value comprised between 9.0 and 10.0 by addition of $CO_2$.

The reaction mass of the comparative Example 1 was purified after distillation by washing with water.

The hydroxypropyl guar so obtained were dried on a fluid bed drier using hot air, and milled. At the end of the process all the hydroxypropyl guar had a moisture content of about 3% by weight.

The MS, impurities and boron content and Brookfield® RVT viscosity (1% by weight in water, 20 rpm, 20° C.) of the hydroxypropyl guar of Examples 1-5 are reported in Table 1, Boron content was determined, after acid digestion of the polygalactomannan ethers, by inductively coupled plasma atomic emission spectrometry (ICP-AES).

TABLE 1

| Sample | Guar | NaOH (g) | PO (g) | MS | Impurities % by wt. | Viscosity mPa * s | Boron (ppm) |
|---|---|---|---|---|---|---|---|
| Example 1* | flour | 89 | 187 | 0.42 | 1.8 | 4300 | 310 |
| Example 2 | flour | 80 | 187 | 0.40 | 6.9 | 2420 | 249 |
| Example 3 | flour | 34 | 155 | 0.42 | 11.1 | 2060 | 220 |

TABLE 1-continued

| Sample | Guar | NaOH (g) | PO (g) | MS | Impurities % by wt. | Viscosity mPa * s | Boron (ppm) |
|---|---|---|---|---|---|---|---|
| Example 4 | split | 33 | 155 | 0.42 | 7.3 | 2560 | 242 |
| Example 5 | flour | 30 | 438 | 1.5 | 15.9 | 1100 | — |

*Comparative

Examples 6-8

Preparation of Purified and Unpurified Carboxymethyl Hydroxypropyl Guar 800 g of guar flour were loaded in a 5 litres stirred reactor at room temperature. The reaction atmosphere was made inert by means of vacuum/nitrogen washings, and, under vigorous stirring, different amounts of NaOH, as reported in Table 2, 68.0 g of sodium chloroacetate and 2.5 g of borax in 350 g of water/isopropanol were added. The mixture was maintained under stirring for 15 minutes at 20° C. The reactor was evacuated and refilled three times with nitrogen then 120 g of propylene oxide were added. The reaction mixture was maintained for 45 min at 70-75° C. under stirring.

Afterwards the reaction system was cooled down to 40° C., the solvent was distilled off and the pH of the reaction mass was brought down to a value comprised between 9.0 and 10.0 by addition of $CO_2$.

The reaction mass of the comparative Example 6 was purified after distillation by washing with water. The carboxymethyl hydroxypropyl guar so obtained were dried on a fluid bed drier using hot air and milled. At the end of the process all the carboxymethyl hydroxypropyl guar of Example 6-8 had a moisture content of about 3% by weight.

The MS, DS, impurities and boron content, and Brookfield® RVT viscosity (1% by weight in water, 20 rpm, 20° C.) of the carboxymethyl hydroxypropyl guar of Examples 6-8 are reported in Table 2.

TABLE 2

| Sample | Guar | NaOH (g) | MS | DS | Impurities % by wt | Viscosity mPa * s | Boron (ppm) |
|---|---|---|---|---|---|---|---|
| Example 6* | flour | 83 | 0.3 | 0.16 | 2.9 | 3300 | 260 |
| Example 7 | flour | 83 | 0.3 | 0.16 | 14.2 | 1930 | 215 |
| Example 8 | flour | 54 | 0.3 | 0.18 | 6.8 | 2100 | 240 |

*Comparative

Applicative Tests

The methods used in the application test are the following:

Dispersibility Test 396 g of tap water and 4 g of sample were added in a 600 ml beaker without any mixing. After 1 minute the mixture were stirred with a magnetic bar (5 cm length) at 1200 rpm. After 1 minute the stirring was stopped and the solution was checked visually in order to verify the presence of lumps or fish eyes (small translucent lumps). The results of the Dispersibility Test, reported in Table 3 and Table 4, was considered positive (OK) if the solutions did not show lumps or fish eyes.

Fann Test

For each sample of Examples 1-8, 500 ml of deionized water and 10 g of KCl were transferred in a Waring Blender cup. The solution temperature was brought to 24° C. The amounts of polygalactomannan ethers as indicated in Table 2 were added to the solutions in 5 seconds under stirring at 2000 rpm. The pH of the samples containing boron was adjusted with acetic acid to a value around 6.50. Fann viscosity at 300 rpm was determined after exactly 2 min ($V_{2'}$).

The solution temperature was maintained at 24° C. for 60 min after the dissolution. After this period the Fann viscosity at 300 rpm ($V_F$) was determined setting the viscosimeter at 600 rpm for 15 seconds before the viscosity determination. The hydration rate at 2 minutes, calculated as $(V_{2'}/V_F) \cdot 100$, is reported in Table 3 for hydroxypropyl guar of Examples 1-5 (HPG) and in Table 4 for carboxymethyl hydroxypropyl guar of Examples 6-8 (CMHPG) (Hydration at 2'(%)).

TABLE 3

| Sample | HPG (g/500 ml) | Dispersibility Test | Hydration at 2' (%) |
|---|---|---|---|
| Example 1* | 2.40 | OK | 74 |
| Example 2 | 2.57 | OK | 92 |
| Example 3 | 2.83 | OK | 88 |
| Example 4 | 2.64 | OK | 87 |
| Example 5 | 3.00 | OK | 96 |

*Comparative

TABLE 4

| Sample | CMHPG (g/500 ml) | Dispersibility Test | Hydration at 2' (%) |
|---|---|---|---|
| Example 6* | 2.40 | OK | 91 |
| Example 7 | 2.71 | OK | 98 |
| Example 8 | 2.88 | OK | 95 |

*Comparative

The results show that the unpurified polygalactomannan ethers according to the disclosure have excellent hydratability and dispersibility that make them perfectly suitable as viscosifier for aqueous based fracturing fluids.

On the contrary, the polygalactomannans ethers of the prior art do not possess the same characteristics.

While the methods of this invention have been described in the terms of the preferred embodiments, it will be apparent to those of skill in the art that variations may be applied to the process described herein without departing from the concept and scope of the invention. All such similar substitutes and modifications obvious to those skilled in the art are deemed to be within the scope of the invention as it is set out in the following claims.

The invention claimed is:

1. A method for treating at least part of a subterranean formation comprising:
   introducing an aqueous fracturing fluid into the subterranean formation, the aqueous fracturing fluid comprising from about 0.3 to about 3.0% by weight of a viscosifying agent wherein the viscosifying agent is an unpurified polygalactomannan ether containing from about 4 to about 25% by dry weight of impurities, wherein the unpurified polygalactomannan ether is prepared according to an etherification process comprising:
   I) reacting a polygalactomannan with an etherifying agent in the presence of an alkaline catalyst; and II) drying and recovering the unpurified polygalactomannan ether, wherein:

the etherification process does not include any purification or washing step; and the impurities of the polygalactomannan ether are byproducts generated during the etherification process.

2. The method of claim 1 wherein the viscosifying agent is dissolved into the fracturing fluid.

3. The method of claims 1 wherein the etherification process additionally comprises adding a crosslinking composition.

4. The method of claim 1 wherein the amount of impurities in the unpurified polygalactomannan ether is calculated as the sum of ashes, glycols and polyglycols.

5. The method of claim 1 wherein the unpurified polygalactomannan ether contains from about 5 to about 20% by dry weight of impurities.

6. The method of claim 3 wherein the unpurified polygalactomannan ether contains from about 0.01 to about 0.05% by weight of the crosslinking agent.

7. The method of Claim 6 wherein the crosslinking agent is a boron containing compound.

8. The method of Claim 6 wherein the crosslinking agent is glyoxal.

9. The method of claim 1 wherein the unpurified polygalactomannan ether is selected from the group consisting of hydroxyalkyl ethers of polygalactomannans, carboxyalkyl ethers of polygalactomannans, mixed carboxyalkyl, hydroxyalkyl ethers of polygalactomannans, cationic ethers of polygalactomannans and combinations thereof.

10. The method of Claim 9 wherein the unpurified polygalactomannan ether is prepared from polygalactomannans selected from the group consisting of Trigonella foenumgraecum (fenugreek gum), *Cyamopsis tetragonoloba* (guar gum), *Cesalpinia spinosa* (tara gum), *Ceratonia siliqua* (locust bean gum or carob gum), and *Cassia tora* and/or *Cassia obtusifolia* (cassia gum).

11. The method of Claim 10 wherein the unpurified polygalactomannan ether is prepared from a polygalactomnnan obtained from *Cyamopsis tetragonoloba* (guargum).

12. The method of claim 11 wherein the unpurified polygalactomannan ether is selected from the group consisting of hydroxypropyl guar, carboxymethyl guar, carboxymethyl hydroxypropyl guar, and combinations thereof.

13. The method of claim 12 wherein the unpurified polygalactomannan ether has a molar substitution as hydroxypropyl of from about 0.2 to about 2.0 and/or a degree of substitution as carboxymethyl of from about 0.1 to about 0.5.

14. The method of claim 13 wherein the unpurified polygalactomannan ether is hydroxypropyl guar that has a hydroxypropyl molar substitution of from about 0.3 to about 0.6.

15. The method of Claim 7 wherein the unpurified polygalactomannan ether is selected from the group consisting of hydroxypropyl guar, carboxymethyl guar, carboxymethyl hydroxypropyl guar, and combinations thereof.

16. The method of claim 15 wherein the unpurified polygalactomannan ether has a molar substitution as hydroxypropyl of from about 0.2 to about 2.0 and/or degree of substitution as carboxymethyl of from about 0.1 to about 0.5.

17. The method of claim 16 wherein the unpurified polygalactomannan ether is hydroxypropyl guar that has a hydroxypropyl molar substitution of from about 0.3 to about 0.6.

18. The method of Claim 8 wherein the unpurified polygalactomannan ether is selected from the group consisting of hydroxypropyl guar, carboxymethyl guar, carboxymethyl hydroxypropyl guar, and combinations thereof.

19. The method of claim 18 wherein the unpurified polygalactomannan ether has a molar substitution as hydroxypropyl of from about 0.2 to about 2.0 and/or degree of substitution as carboxymethyl of from about 0.1 to about 0.5.

20. The method of claim 19 wherein the unpurified polygalactomannan ether is hydroxypropyl guar that has a hydroxypropyl molar substitution of from about 0.3 to about 0.6.

21. The method of claim 11 wherein the treating is hydraulic fracturing.

* * * * *